United States Patent
Lee

(10) Patent No.: US 7,536,009 B2
(45) Date of Patent: May 19, 2009

(54) FOLDER TYPE MOBILE TERMINAL

(75) Inventor: Choong-Jae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 664 days.

(21) Appl. No.: 10/733,515

(22) Filed: Dec. 12, 2003

(65) Prior Publication Data

US 2004/0132514 A1   Jul. 8, 2004

(30) Foreign Application Priority Data

Dec. 12, 2002   (KR) .................... 10-2002-0079300

(51) Int. Cl.
*H04M 9/00* (2006.01)
*H04M 1/00* (2006.01)

(52) U.S. Cl. .................... 379/433.01; 379/433.04; 455/90.3

(58) Field of Classification Search ............ 379/433.04, 379/433.12, 433.13, 437, 441, 457; 455/550.1, 455/575.1, 575.4, 575.3; 359/44
See application file for complete search history.

(56) References Cited

U.S. PATENT DOCUMENTS

| | | | |
|---|---|---|---|
| 5,002,184 A | | 3/1991 | Lloyd |
| 5,150,231 A | * | 9/1992 | Iwamoto et al. ............... 349/60 |
| 5,689,824 A | | 11/1997 | Nagai |
| 5,804,780 A | * | 9/1998 | Bartha ........................ 200/5 A |
| 5,933,783 A | * | 8/1999 | Kawakami et al. .......... 455/566 |
| 6,011,699 A | | 1/2000 | Murray et al. |
| 6,064,453 A | | 5/2000 | Inubushi et al. ............... 349/58 |
| 6,148,080 A | * | 11/2000 | Collin .................... 379/433.02 |
| 6,229,994 B1 | | 5/2001 | Pavet .......................... 455/90 |
| 6,904,300 B1 | * | 6/2005 | Maattanen et al. ........ 455/575.1 |
| 6,957,083 B2 | * | 10/2005 | Ikeda et al. ............... 455/556.1 |
| 6,967,280 B1 | * | 11/2005 | Boatwright et al. ......... 174/377 |
| 7,006,854 B2 | * | 2/2006 | Choi ........................ 455/575.3 |
| 2001/0049293 A1 | * | 12/2001 | Shimazaki .................. 455/550 |
| 2002/0128053 A1 | | 9/2002 | Jung ........................... 455/575 |
| 2003/0064638 A1 | | 4/2003 | Fuse et al. |
| 2004/0038703 A1 | | 2/2004 | Noto et al. |
| 2004/0077385 A1 | * | 4/2004 | Makino et al. ........... 455/575.1 |
| 2005/0141187 A1 | * | 6/2005 | Shimizu ..................... 361/683 |

(Continued)

FOREIGN PATENT DOCUMENTS

CN    1233126    10/1999

(Continued)

OTHER PUBLICATIONS

Chinese Office Action dated Nov. 12, 2004.

(Continued)

*Primary Examiner*—Curtis Kuntz
*Assistant Examiner*—Phylesha Dabney
(74) *Attorney, Agent, or Firm*—Ked & Associates LLP

(57) ABSTRACT

A folder type mobile terminal which prevents damage to a display such as a liquid crystal display (LCD), due to an external impact is provided. A display protecting member incorporated into the upper and lower cover of the folder portion of the mobile terminal prevents deformation of the upper cover from damaging the display module. More particularly, support ribs which extend along the circumference of the display module and beyond the upper surface of the display module prevent contact between the upper cover an d the display module and preclude damage to the display module.

24 Claims, 5 Drawing Sheets

U.S. PATENT DOCUMENTS

2006/0110608 A1    5/2006    Azumi et al.

FOREIGN PATENT DOCUMENTS

| CN | 2414554 Y | | 1/2001 |
|---|---|---|---|
| CN | 2447830 Y | | 9/2001 |
| CN | 1375976 | | 10/2002 |
| JP | 09-283950 | | 10/1997 |
| JP | 2001345898 A | * | 12/2001 |
| JP | 2000-194268 | | 7/2003 |
| JP | 2004023610 A | * | 1/2004 |
| KR | 1998-0057623 | | 10/1998 |
| KR | 2001-0027039 | | 4/2001 |
| KR | 0038013/2002 | | 5/2002 |
| KR | 2002-0066806 | | 8/2002 |

OTHER PUBLICATIONS

Korean Office Action dated Oct. 16, 2004.
Korean Office Action dated Oct. 21, 2004.
Korean Office Action dated Oct. 27, 2004.
Chinese Office Action dated Dec. 10, 2004.
Chinese Office Action dated Jun. 1, 2007 (English and Chinese).

* cited by examiner

FOLDER TYPE MOBILE TERMINAL

BACKGROUND OF THE INVENTION

1. Field of the Invention

The invention relates to mobile terminal, and particularly, to a folder type mobile terminal.

2. Background of the Related Art

Folder type mobile terminals have become very widely used due to a number of advantages associated with them. One such advantage is that a folder type mobile terminal can accommodate a large display, such as a liquid crystal display (LCD), making it easier to view information displayed to a user via the display. For example, newly developed dual LCD folder type mobile terminals which have an LCD mounted not only on an inner side of the folder, but also on an outer side thereof, are becoming increasingly popular. As these LCDs become larger and thinner, an improved terminal structure is needed to protect the LCD from external impact.

The conventional art folder type mobile terminal shown in FIG. 1 has a body 8 in which a variety of electric equipment is mounted, a menu button 2 and a number of dial buttons 4 on a front surface thereof, and a battery 6 at a rear surface thereof. A folder 10 is rotatably connected to the body 8, and is provided with an LCD at both an inner side and an outer side thereof.

FIG. 2 is a disassembled perspective view of a mobile terminal in accordance with the conventional art, and FIG. 3 is a sectional view of a mobile terminal with the folder engaged, in accordance with the conventional art.

The folder of the conventional art mobile terminal includes an upper cover 102 which forms an outer surface of the terminal, and a lower cover 104 which engages with the upper cover 102 and which is rotatably connected to the body 8. An LCD module 106 with a sub LCD 108 at a front surface thereof and a main LCD 110 at a rear surface thereof is mounted between the upper cover 102 and the lower cover 104. A transparent sub window 120 is provided in the upper cover 102 to allow a user to view information displayed on the sub LCD 108. A transparent main window 112 is provided in the lower cover 104 to allow a user to view information displayed on the main LCD 110.

A guide protrusion 126 is formed at both edges of the upper cover 102, and a guide groove 128 corresponding to the guide protrusion 126 is formed at both edges of the lower cover 104 so as to properly align an engagement position between the upper cover 102 and the lower cover 104. A supporting rib 130 for supporting the LCD module 106 is integrally formed at both edges of the lower cover 104 where the guide groove 128 is formed. The supporting rib 130 is typically injection-molded as an integral part of the lower cover 104 to a predetermined thickness and height, and protects the LCD module 106 by covering an outer surface thereof. As shown in FIG. 3, the supporting rib is formed to a predetermined thickness L, and a height of the supporting rib 130 is lower than that of the LCD module 106. That is, there is a height difference H between the supporting rib 130 and an upper surface of the LCD module 106.

Assembly of the conventional art folder type mobile terminal will now be described. First, the LCD module 106 is mounted in the lower cover 104, at an inner side of the supporting rib 130. The guide protrusion 126 of the upper cover 102 is inserted into the guide groove 128 of the lower cover 104 so as to align the upper cover 102 and the lower cover 104. The upper cover 102 is then engaged with the lower cover 104, and the LCD module 106 is supported by the supporting rib 130 so as to prevent damage due to an external impact. thereby completing the assembly process.

However, in the conventional folder type mobile terminal, a thickness of the supporting rib 130 must be thick enough support the LCD module 106 if it is to sufficiently protect the LCD module 106, the sub LCD 108, and the main LCD 110. However, as the thickness of the supporting rib 130 increases, the entire size of the terminal increases, which is undesirable. Also, because the height of the supporting rib 130 is lower than the height of the LCD module 106, if the upper cover 102 is deformed by an external impact, the upper cover 102 comes in direct contact with the LCD module, resulting in damage the LCD.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

To achieve these and other advantages, in whole or in part, and in accordance with the purpose of the invention, as embodied and broadly described herein, there is provided a folder type mobile terminal in accordance with an embodiment of the invention, comprising an upper cover, a lower cover attached to the upper cover and configured to receive a display module therein, and a display protecting member configured to be fitted at an inner surface of the lower cover and to cover an outer surface of the display module so as to protect the display module from an external force.

To further achieve these and other advantages, in whole or in part, and in accordance with the purpose of the invention, as embodied and broadly described herein, there is provided a folder portion, comprising a first cover and a second cover, wherein the first cover and the second cover are configured to be attached so as to form a space therebetween, and a display protecting member configured to be installed in the space formed between the first cover and the second cover and to surround a display module installed therein so as to prevent contact between the display module and the folder. To further achieve these and other advantages, in whole or in part, and in accordance with the purpose of the invention, as embodied and broadly described herein, there is provided a folder type mobile terminal in accordance with an embodiment of the invention, comprising a display protecting mechanism for a mobile terminal in accordance with an embodiment of the invention, comprising a lower portion, an open portion formed in the lower portion and configured to receive a display module, a supporting rib formed extended upwardly from the lower portion a predetermined height and width, and configured to cover a circumferential surface of the display module, a first gap formed between an upper surface of the supporting rib and a lower surface of a cover of the mobile terminal, and a second gap formed between an upper surface of the display module and the lower surface of the cover of the mobile terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

In the drawings.

DETAILED DESCRIPTION OF PREFERRED EMBODIMENTS

Figure 4:
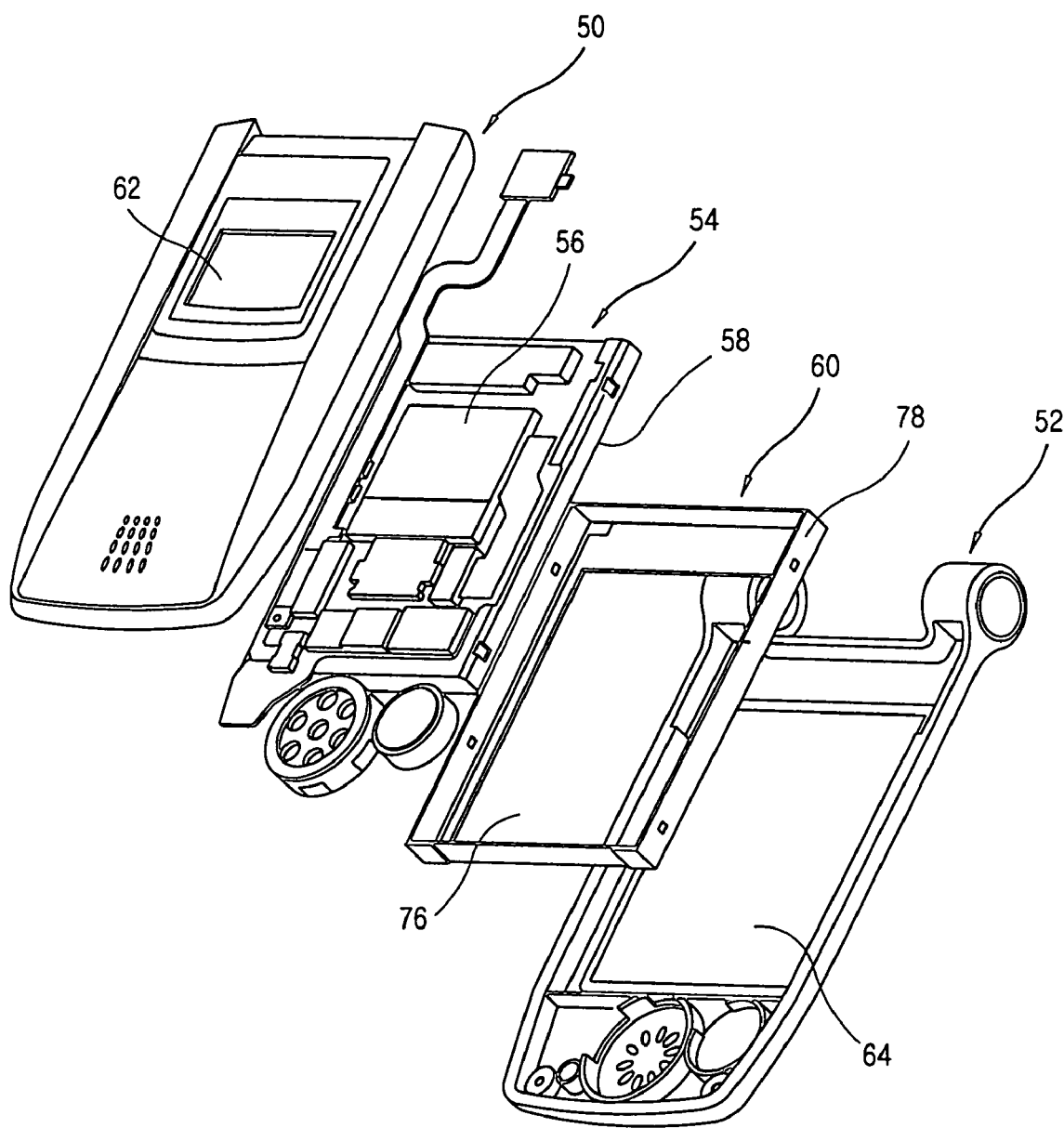
FIG. 4 is a disassembled perspective view of a folder of a mobile terminal according to an embodiment of the invention.
Figure 5:
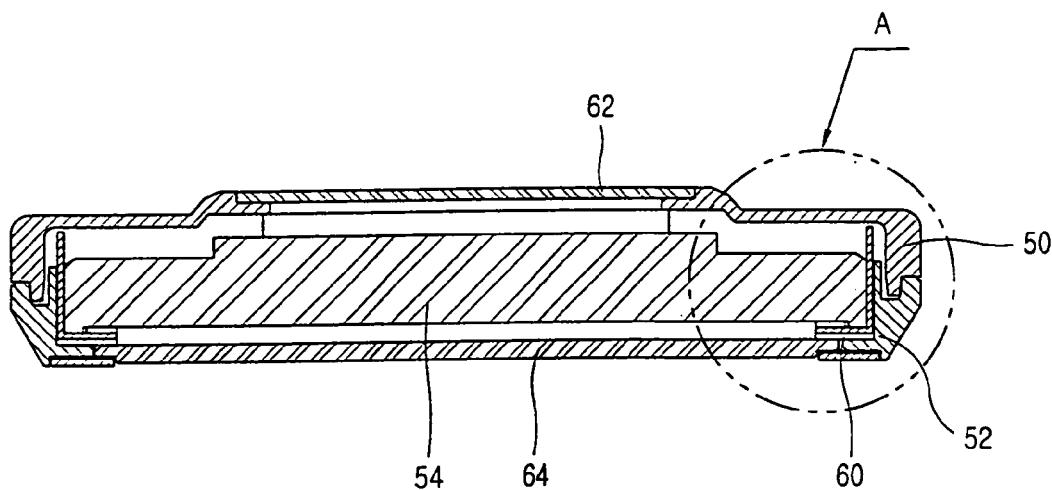
FIG. 5 is a sectional view of a mobile terminal with the folder engaged in accordance with an embodiment of the invention.
Figure 6:
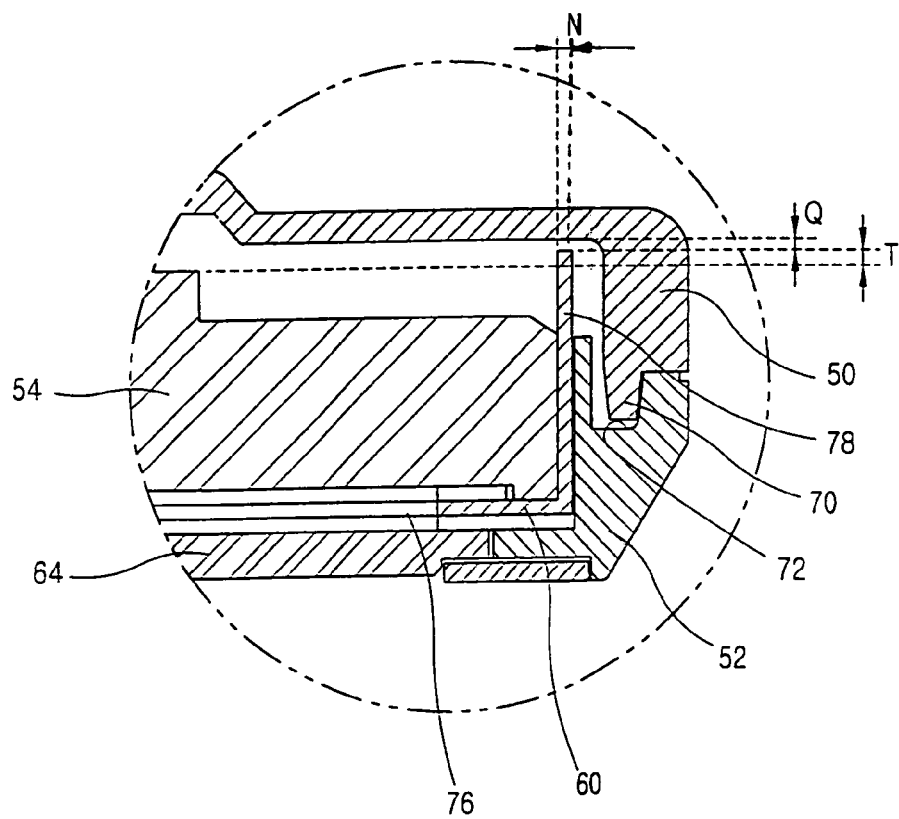
FIG. 6 is an enlarged view of part 'A' of FIG. 5.

As shown in FIGS. 4 and 5, a folder of a mobile terminal according to an embodiment of the invention includes an upper cover 50 which forms an outer surface of the terminal, and a lower cover 52 which is attached to the upper cover 50 and which is configured to be rotatably coupled to a body 8 of the mobile terminal. A display module 54, which is installed between the upper cover 50 and the lower cover 52, has a sub display 56, such as a liquid crystal display (LCD), at a front surface thereof, and a display 58, such as a main LCD, at a rear surface thereof. A display protecting member 60 is attached to an inner side of the lower cover 52, and is configured to support the display module 54.

A transparent sub window 62 is provided in the upper cover 50 to allow a user to view information displayed on the sub display 56. A transparent main window 64 is provided in the lower cover 52 to allow a user to view information displayed on the main display 58. A guide protrusion 70 is formed at edges of a lower surface of the upper cover 50, and a corresponding guide groove 72 is formed at edges of an upper surface of the lower cover 52 so as to properly align the upper cover 50 and the lower cover 52.

A display protecting member 60 is provided at a bottom surface of the lower cover 52. The display protecting member 60 is provided with an opening portion 76 for viewing the main display 58. A supporting rib 78 of predetermined height is formed along a circumferential surface of the display protecting member 60, and is configured to cover an outer circumferential surface of the display module 54.

The supporting rib 78 extends beyond an upper surface of the display module 54 by a width T. The supporting rib 78 forms a gap Q with an inner surface of the upper cover 50. If an external impact is applied to the upper cover 50, deformation of the upper cover 50 is prevented due to the support provided by the supporting rib 78 and the gap Q maintained between the upper surface of the supporting rib 78 and the inner surface of the upper cover 50. Thus subsequent damage to the display is prevented.

Figure 1:
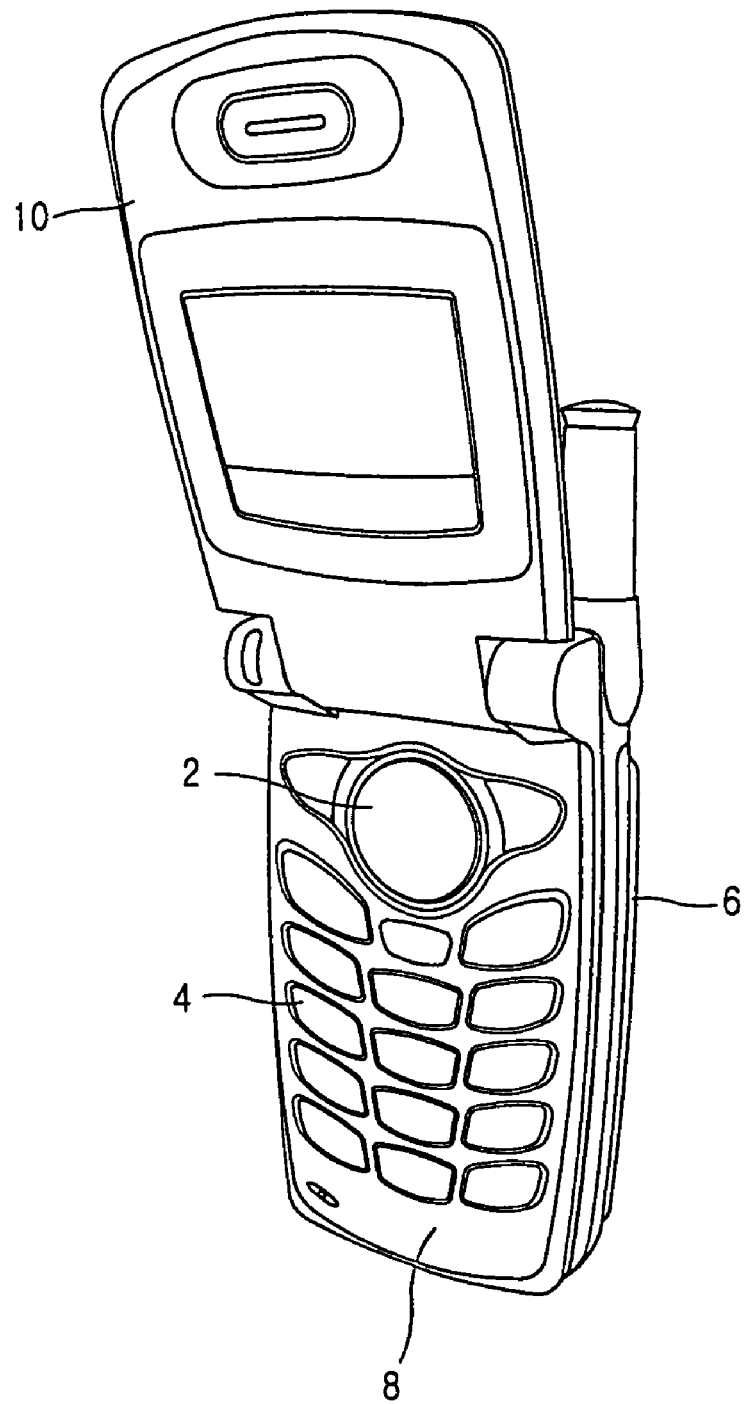
FIG. 1 is a perspective view of a conventional art folder type mobile terminal.
Figure 2:
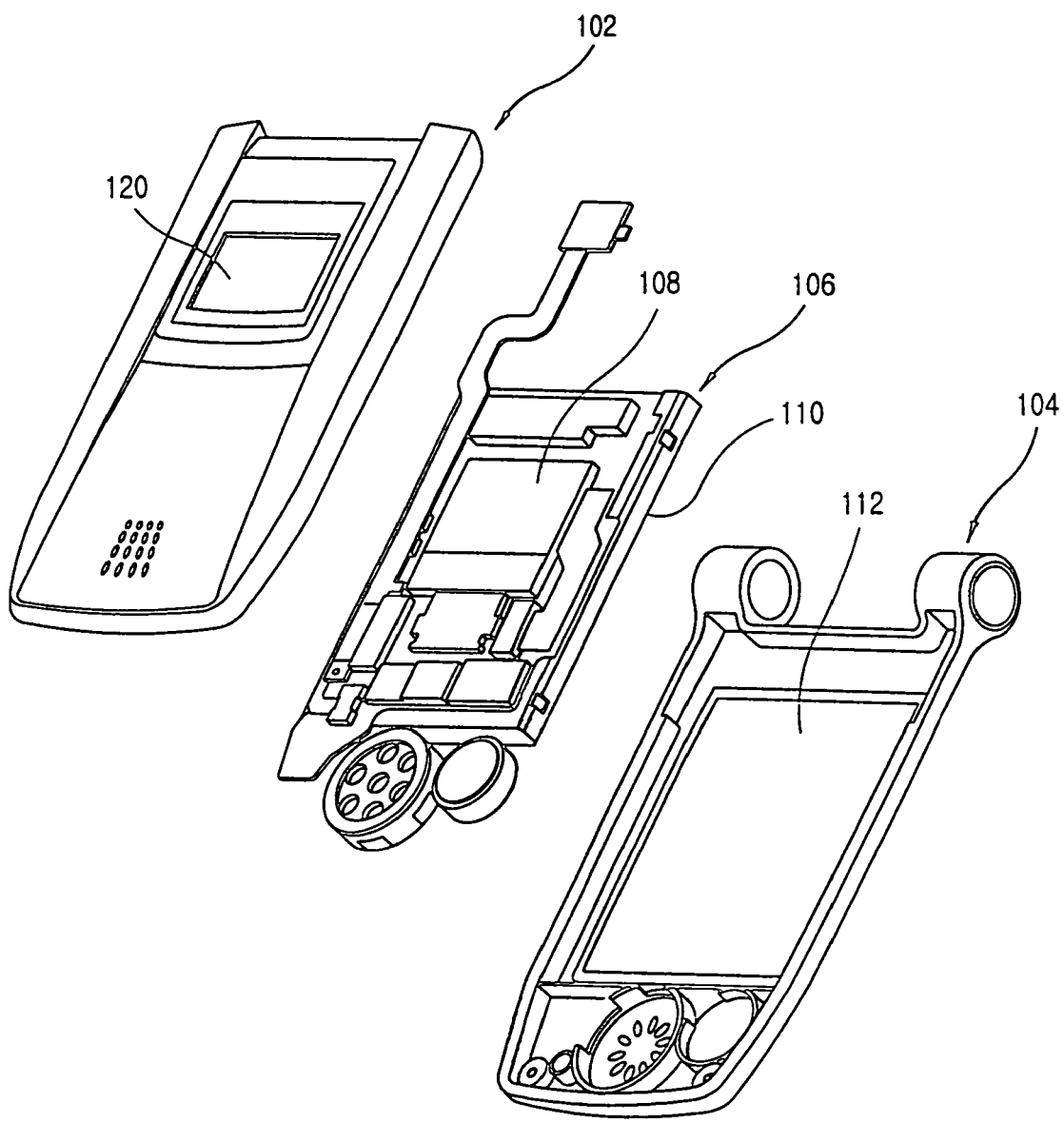
FIG. 2 is a disassembled perspective view of a conventional art folder of a mobile terminal.
Figure 3:
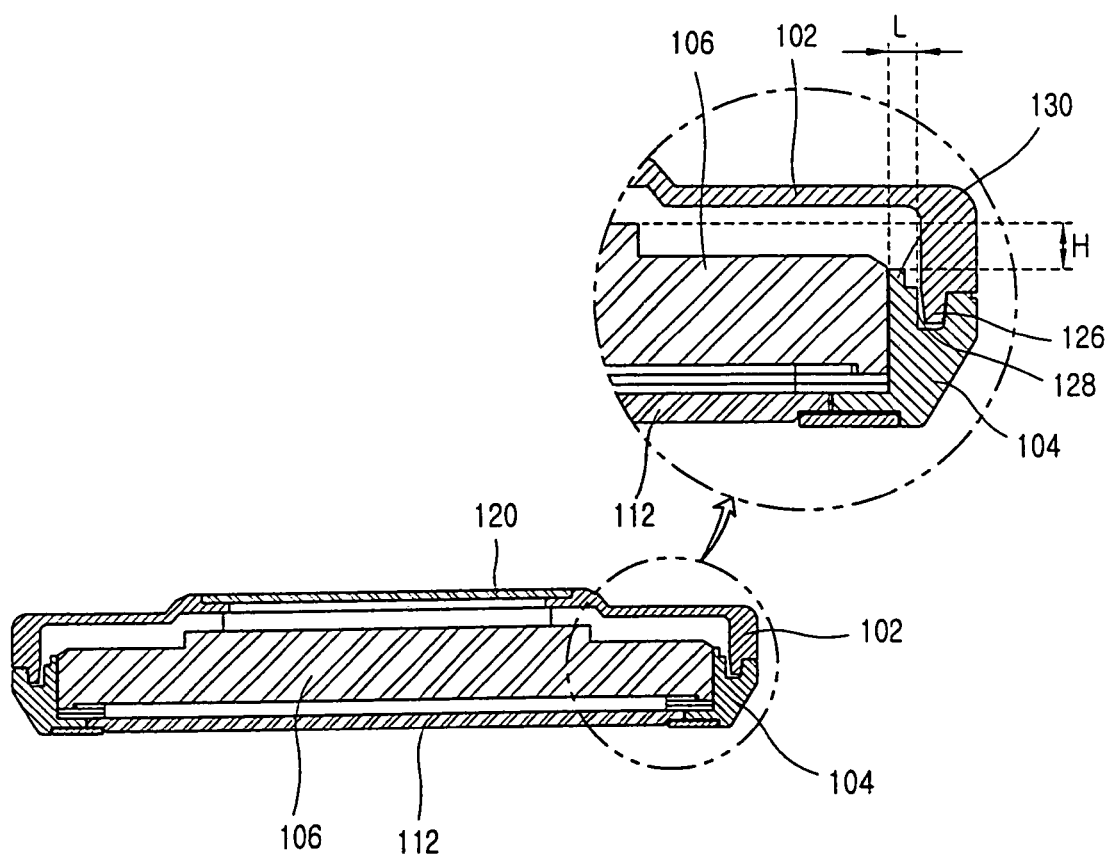
FIG. 3 is a sectional view of a conventional art mobile terminal with the folder engaged.

The display protecting member 60 can be formed of a metal material having a certain degree of rigidity, such as stainless steel, thus increasing effectiveness with a minimal thickness. Additionally, as a thickness of the supporting rib 78 decreases, an entire size of the folder can be decreased. More particularly, because a thickness N of the display protecting member 60 is thinner than the thickness L of the supporting rib 130 discussed with respect to the conventional art mobile terminal and shown in FIG. 3, the size of the terminal can be decreased.

Assembly of the folder of the mobile terminal in accordance with an embodiment of the invention will now be explained. First, the display protecting member 60 is installed on the lower cover 52. The display module 54 is then installed on an inner surface of the display protecting member 60. Next, the upper cover 50 is installed so as to cover the display module 54, and the upper cover 50 and the lower cover 52 are engaged. At this time, a guide protrusion 70 of the upper cover 50 is inserted into a guide groove 72 of the lower cover 52, thereby aligning the upper cover 50 and the lower cover 52 and completing the assembly process.

When the assembly of the folder is completed, the supporting rib 78 of the display protecting member 60 extends beyond the upper surface of the display module 54, and a gap is maintained between the upper surface of the supporting rib 78 and the lower surface of the upper cover 50. If an external impact is applied to the upper cover 50 the lower surface of the upper cover 50 will be supported by the upper surface of the supporting rib 78 thus preventing deformation of the upper cover 50 and preventing subsequent damage to the display module 54.

A folder type terminal in accordance with an embodiment of the invention has at least the following advantages.

The display protecting member 60 formed of a metal material having a certain degree of rigidity and of minimal thickness can be mounted at the circumference of the display module 54 to provide providing stable support to the display module 54 and decrease the size of the terminal.

Additionally, because the display protecting member 60 extends beyond the upper surface of the display module 54, when an external impact is applied to the upper cover 50, a deformation of the upper cover 50 is prevented, as the lower surface of the upper cover 50 comes into contact with the supporting rib 78, thus preventing subsequent damage to the display module 54.

The folder type mobile terminal according to embodiments of the invention is capable of protecting a display, such as an LCD, from damage due to an external impact by including a display protecting member to protect the display.

The folder type mobile terminal according to embodiments of the invention is also capable of reducing a size of a terminal by forming a display protecting member of a metal material, thus making the protecting member thin.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A folder type mobile terminal, comprising:
   an upper cover;
   a lower cover attached to the upper cover and configured to receive a display module therein; and
   a display protecting member configured to be fitted at an inner surface of the lower cover and to cover an outer surface of the display module so as to protect the display module from an external force, wherein the display protecting member comprises a lower portion and a first supporting rib formed extended upwardly a predetermined height and width from the lower portion so as to cover a circumferential surface of the display module and wherein a first air gap is maintained between an upper surface of the first supporting rib and a lower surface of the upper cover, wherein the lower surface of the upper cover deflects through the air gap when an external impact is imposed on the upper cover, the upper surface of the first supporting rib arranged to contact the lower surface of the deflecting upper cover to prevent the lower surface of the deflecting upper cover from contacting the display module, and wherein a second air gap is maintained between all areas of the upper surface of the display module and the lower surface of the upper cover when the upper and lower covers of the mobile terminal are attached.

2. The terminal of claim 1, wherein the display protecting member is configured to surround the circumferential surface of the display module.

3. The terminal of claim 1, wherein a height of the first supporting rib is greater than a height of the display module.

4. The terminal of claim 1, wherein the display module is mounted in an open portion formed on a lower portion of the display protecting member.

5. The terminal of claim 1, wherein the display protecting member is formed of a metal material.

6. The terminal of claim 5, wherein the display protecting member is formed of stainless steel.

7. The terminal of claim 1, wherein the display module comprises at least a sub display and a main display, and wherein at least one of the displays comprises a liquid crystal display (LCD).

8. The terminal of claim 1, wherein the display protecting member does not contact any portion of the upper cover.

9. The terminal of claim 1, wherein the display protecting member has a lower surface substantially perpendicular to the first supporting rib and contacting the lower cover.

10. The terminal of claim 1, wherein the display protecting member includes an aperture to allow for viewing of a first screen of a display module through an interior surface of a folder, said screen not viewable when the folder is in a closed position.

11. A folder type mobile terminal, comprising:
a folder portion, comprising a first cover and a second cover, wherein the first cover and the second cover are configured to be attached so as to form a space therebetween; and
a display protecting member configured to be installed in the space formed between the first cover and the second cover and to surround a display module installed therein so as to prevent contact between the display module and the folder,
wherein the display protecting member comprises a lower portion and a supporting rib formed extended upwardly from the lower portion, wherein the supporting rib is configured to cover a circumferential surface of the display module, and wherein a predetermined clearance in the form of a first air gap is formed between an upper surface of the supporting rib and a lower surface of the first cover when the first cover and the second cover are attached prior to an external impact on the first cover, and wherein a second air gap is maintained between all areas of an upper surface of the display module and a lower surface of the first cover when the first cover and the second cover are attached so that, when an external force is applied to the first cover, deformation of the first cover is substantially prevented, thereby preventing damage to the display module.

12. The terminal of claim 11, wherein an upper end of the supporting rib extends beyond an upper surface of the display module.

13. The terminal of claim 11, wherein the display module is installed in an open portion formed on a lower portion of the display protecting member.

14. The terminal of claim 11, wherein the display protecting member is formed of a metal material.

15. The terminal of claim 11, wherein the display module comprises at least a sub display and a main display, and wherein at least one of the displays comprises a liquid crystal display (LCD).

16. A display protecting mechanism for a mobile terminal, comprising:
a lower portion;
an open portion formed in the lower portion and configured to receive a display module; and
a supporting rib formed extended upwardly from the lower portion a predetermined height and width, and configured to cover a circumferential surface of the display module, wherein the display protecting mechanism is configured to be installed in a lower cover of the mobile terminal such that a predetermined clearance in the form of a first air gap is formed between an upper surface of the supporting rib and a lower surface of an upper cover of the mobile terminal when the upper and lower covers of the mobile terminal are attached prior to an external impact on the upper cover; and
a second alt gap is formed between all areas of an upper surface of the display module and the lower surface of the upper cover of the mobile terminal when the upper and lower covers of the mobile terminal are attached.

17. The display protecting mechanism of claim 16, wherein the display protecting mechanism is further configured such that when it is installed in the mobile terminal an upper portion of the supporting rib extends beyond the upper surface of the display module installed in the open portion.

18. The display protecting mechanism of claim 17, wherein the display protecting mechanism is further configured such that when it is installed in the mobile terminal the second gap is greater than zero when the first alt gap is reduced to substantially zero due to application of an external force to the upper cover of the mobile terminal.

19. The display protecting mechanism of claim 17, wherein the display protecting mechanism is further configured such that when it is installed in the mobile terminal the second gap remains greater than the first air gap when an external force is applied to the cover of the mobile terminal.

20. The display protecting mechanism of claim 16, wherein the lower portion and supporting rib are formed of stainless steel.

21. A mobile terminal comprising the display protecting mechanism of claim 16.

22. A folder-type mobile terminal comprising:
an upper cover;
a lower cover attached to the upper cover and configured to receive a display module therein; and
a display protecting member configured to be fitted at an inner surface of the lower cover and to cover an outer surface of the display module so as to protect the display module from an external force, wherein the display protecting member comprises a lower portion and a first supporting rib formed extended upwardly a predetermined height and width from the lower portion so as to cover a circumferential surface of the display module and wherein a predetermined air gap is maintained between an upper surface of the first supporting rib and a lower surface of the upper cover, wherein the lower surface of the upper cover deflects through the air gap when an external impact is imposed on the upper cover, the upper surface of the first supporting rib arranged to contact the lower surface of the deflecting upper cover to prevent the lower surface of the deflecting upper cover from contacting the display module, said terminal further comprising: a second supporting rib extending from the lower cover, wherein the second supporting rib has a surface that is substantially parallel to and in contact with a surface of the first supporting rib.

23. The terminal of claim 22, wherein the display module is secured to the display protecting member based on a friction fit between the first and second supporting ribs.

24. The terminal of claim 22, wherein the first supporting rib has a thickness that is substantially equal to or less than a thickness of the second supporting rib.

* * * * *